(12) United States Patent
Gale et al.

(10) Patent No.: US 6,425,253 B1
(45) Date of Patent: Jul. 30, 2002

(54) METHOD FOR DETECTING LOW-CHARGE CONDITION IN AIR CONDITIONING SYSTEM AND DEVICE INCORPORATING SAME

(75) Inventors: Joseph A Gale, Northville Township; Kwangtaek Hong, Ann Arbor, both of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 24 days.

(21) Appl. No.: 09/587,585

(22) Filed: Jun. 2, 2000

(51) Int. Cl.$^7$ .................................................. F25B 49/02
(52) U.S. Cl. ........................................ 62/129; 62/126
(58) Field of Search ........................ 62/228.1, 126, 62/129, 125, 130, 208, 209, 226, 227

(56) References Cited

U.S. PATENT DOCUMENTS

| | | | |
|---|---|---|---|
| 3,946,574 A | 3/1976 | Portera ........................ 62/158 |
| 4,873,837 A | 10/1989 | Murray ........................ 62/199 |
| 5,301,514 A | * 4/1994 | Bessler ........................ 62/126 |
| 5,481,884 A | * 1/1996 | Scoccia ........................ 62/129 |
| 5,713,213 A | * 2/1998 | Nobuta et al. ................ 62/126 |
| 5,749,236 A | 5/1998 | Tavian et al. ................. 62/186 |
| 5,934,087 A | * 8/1999 | Watanabe et al. ......... 62/129 X |

* cited by examiner

Primary Examiner—Harry B. Tanner
(74) Attorney, Agent, or Firm—Mark P. Calcaterra

(57) ABSTRACT

A method for detecting a low-charge state in an air conditioning system. The method monitors the temperature of the air exiting the evaporator to determine the existence of a low-charge state. A low-charge state exists if the temperature of the air exiting the evaporator is less than a predetermined temperature limit. A low-charge state also exists if the rate with which the difference between the temperature of the air exiting the evaporator and the ambient air temperature is less than a predetermined slope. An air conditioning system having a controller which prevents a compressor from cycling on the detection of a low-charge state is also provided.

25 Claims, 3 Drawing Sheets

METHOD FOR DETECTING LOW-CHARGE CONDITION IN AIR CONDITIONING SYSTEM AND DEVICE INCORPORATING SAME

BACKGROUND OF THE INVENTION

1. Technical Field

The present invention relates generally to air conditioning systems and more particularly to an air conditioning system and a method which detects a low-charge state.

2. Discussion

Modern air conditioning systems typically include a compressor, a condenser, a throttling device and an evaporator. Operation of the compressor adds heat to a gaseous refrigerant as well as increases its pressure. High-temperature, high-pressure gaseous refrigerant exiting the compressor is delivered to the condenser where excess heat is removed, causing the refrigerant to condense to a relatively low-temperature, high-pressure liquid refrigerant. The liquid refrigerant is then discharged to the expansion valve.

The expansion valve meters the amount of refrigerant that is discharged to the evaporator, causing the low-temperature, high-pressure liquid refrigerant to change to a lower-temperature, low-pressure gaseous state. A blower forces air over a heat exchanger surface on the evaporator causing the gaseous refrigerant to absorb heat, cooling the air. Gaseous refrigerant is then returned to the compressor.

To maintain the performance of the air conditioning system, it is necessary that the system be properly charged (i.e., the system must have a quantity of refrigerant that exceeds a predetermined minimum amount). If the air conditioning system looses a sufficient amount of refrigerant, the air conditioning system will not cool the air to the maximum extent possible. Furthermore, operation of the air conditioning system in a low-charge state may damage the compressor, which is typically the most expensive component of the air conditioning system.

Conventional air conditioning systems do not include a means for detecting a low-charge state. Consequently, it is necessary to rely on the perception and judgment of the users of these systems to detect symptoms that are characteristic of a low-charge state. The symptom most readily detected with such systems is an output temperature of air exiting the evaporator that is "warmer than normal". Unfortunately, as the loss of refrigerant from an air conditioning system is usually gradual, the user is not likely to notice the change in the output temperature until a substantial amount of refrigerant has been lost from the system.

Complicating matters is that technicians responsible for trouble-shooting and maintaining these air conditioning systems have no direct means for detecting a low-charge state. As such, the technician is typically forced to employ a decision-making process having several steps of relatively low reliability to develop a plan for dealing with the observations of the air conditioning system user. The process usually includes the verification that the output temperature is relatively high and the re-charging the air conditioning system. Recharging the air conditioning system is a time consuming process, requiring that the refrigerant in the air conditioning system first be evacuated and then a proper quantity of fresh refrigerant be delivered to the air conditioning system. This process typically requires several hours to complete, tying up not only the technician, but also other resources such as the tooling, equipment and possibly even a service bay.

Considering modern standards of accuracy and repeatability, this trouble-shooting process renders it highly likely that some air conditioning systems are being recharged unnecessary. Furthermore, it is also likely that other air conditioning systems may not be being serviced when necessary. To avoid these situations, some air conditioning systems have proposed the use of a dedicated sensor in an attempt to more reliably detect a low-charge state. One such system relies on a low-pressure switch placed between the compressor and the evaporator. This system is premised on the fact that the liquid refrigerant delivered from the evaporator to the compressor will have a relatively lower pressure if the compressor is operated in a low-charge state. Not only does this approach add a considerable amount of cost to the air conditioning system, this approach requires a substantial reduction in the pressure of the refrigerant delivered to the compressor before a low-charge state is detected. Accordingly, it is possible in a system of this type that the low-charge state will go undetected for a considerable period of time, permitting the compressor to be operated repeatedly and damaged.

A second system relies on a sub-cool temperature sensor placed between the expansion valve and the condenser which monitors the temperature of the gaseous refrigerant delivered to the expansion valve. While this arrangement has been shown to be effective at detecting a low-charge state, it is extremely costly, being approximately three times more expensive than the low-pressure switch discussed above. Accordingly, there remains a need in the art for an air conditioning system which is able to detect a low-charge condition in a reliable manner and at a relatively low cost.

SUMMARY OF THE INVENTION

It is one object of the present invention to provide a method for detecting a low-charge state in an air conditioning system which provides early yet reliable results.

It is another object of the present invention to provide a method for detecting a low-charge state in an air conditioning system which may be economically incorporated into an air conditioning system.

It is a further object of the present invention to provide a method for detecting a low-charge state in an air conditioning system which employs the slope of the difference between the ambient temperature and the evaporator temperature to determine the existence of a low-charge state.

It is yet another object of the present invention to provide a method for detecting a low-charge state in an air conditioning system which employs the temperature of the evaporator to determine the existence of a low-charge state.

It is a further object of the present invention to provide an air conditioning system which detects a low-charge state in a reliable yet economical manner.

In one preferred form, the present invention provides a method for detecting a low-charge state in an air conditioning system. The method includes the steps of detecting a temperature of air exiting an evaporator and responsively producing an evaporator temperature signal; detecting an ambient air temperature and responsively producing an ambient air temperature signal; detecting at least one operational characteristic of the air conditioning system and responsively producing an operational signal in response thereto; and receiving the evaporator temperature signal, the ambient air temperature signal and the operational signal and responsively detecting a low-charge condition of the air conditioning system. An air conditioning system having a controller which prevents a compressor from cycling on the detection of a low-charge state is also provided.

BRIEF DESCRIPTION OF THE DRAWINGS

Additional advantages and features of the present invention will become apparent from the subsequent description and the appended claims, taken in conjunction with the accompanying drawings wherein:

DETAILED DESCRIPTION OF THE PREFERRED EMBODIMENT

Figure 1A:
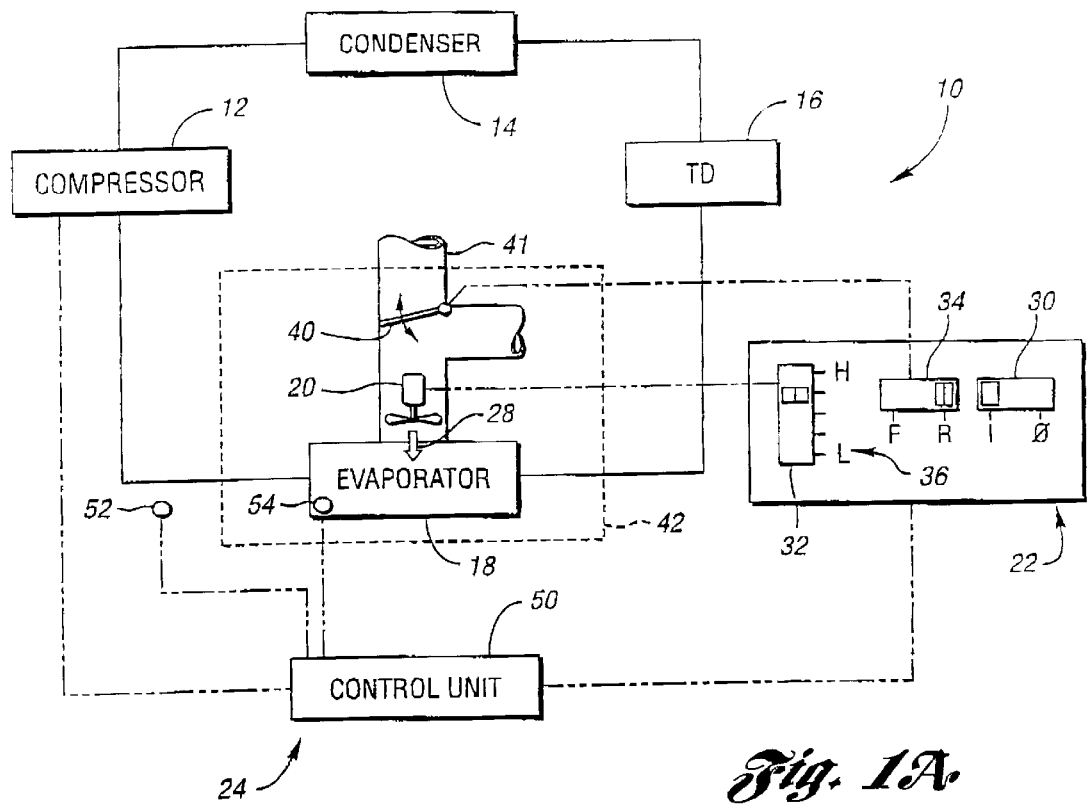
FIG. 1A is a schematic illustration of an air conditioning system constructed in accordance with the teachings of a preferred embodiment of the present invention.

With reference to FIG. 1A of the drawings, an air conditioning system constructed in accordance with the teachings of the present invention is generally indicated by reference numeral 10. Air conditioning system 10 is shown to include a compressor 12, a condenser 14, a throttling device 16, an evaporator 18, a blower 20, a control panel 22 and a controller 24. Compressor 12, condenser 14, throttling device 16, evaporator 18, blower 20 and control panel 22 are conventional in their construction and operation and as such, need not be discussed in detail. Briefly, compressor 12 is operable for increasing the pressure of a gaseous refrigerant. Heat is a byproduct of the process and as such, the refrigerant exiting compressor 12 is also at an elevated temperature. High-temperature, high-pressure gaseous refrigerant exiting compressor 12 is delivered to condenser 14 where heat is discharged from the refrigerant to a heat exchanger surface of the condenser 14. Air is forced over the heat exchanger surface of the condenser 14, either by a mechanical device, such as a fan, or the movement of the condenser 14 through its environment, such as in a vehicular application, causing condenser 14 to release heat to the environment. This permits condenser 14 to continuously cool the refrigerant, causing the refrigerant to condense such that relatively low-temperature, high-pressure liquid refrigerant is discharged to throttling device 16.

Throttling device 16, which may be a thermal expansion valve or an orifice tube, is operable for metering the amount of refrigerant that is discharged to evaporator 18. The metering operation of throttling device 16 creates a pressure differential which permits the refrigerant delivered to evaporator 18 to change to a low-temperature, low-pressure gaseous state. Evaporator 18 facilitates the transfer of heat between the gaseous refrigerant and the output air 28 which is forced over the heat transfer surfaces of the evaporator 18 by blower 20.

Control panel 22 and controller 24 are employed to control the operation of air conditioning system 10. Control panel 22 includes a power switch 30, a blower speed switch 32 and a mode switch 34. Power switch 30 is operable in a first state for activating air conditioning system 10 and a second state for deactivating air conditioning system 10. Blower speed switch 32 includes a plurality of speed positions 36 which are operable for selectively controlling the speed with which blower 20 operates. In the particular example illustrated, blower speed switch 32 has four positions, each of which provides a different voltage to blower 20. Accordingly, a switch position which provides the highest voltage to blower 20 would cause blower 20 to operate at its highest speed. Similarly, a switch position which provides the lowest voltage to blower 20 would cause blower 20 to operate at its lowest speed.

Mode switch 34 is operable for selectively controlling the source of the air used for output air 28. Placement of mode switch 34 in a first state causes a valve 40 to cooperate with a duct 41 to form a flow path which permits air to be drawn in from the exterior of the structure 42 which air conditioning system 10 is cooling. Structure 42 may be a stationary structure, such as a room or a house, or may be a mobile structure, such as an automotive vehicle. Placement of mode switch 34 in a second state causes valve 40 to cooperate with duct 41 to form a flow path which permits air within the structure 42 to be recirculated to evaporator 18. Control panel 22 generates signals corresponding to the operational characteristics of air conditioning system 10 and responsively produces an operational signal in response thereto.

Figure 1B:
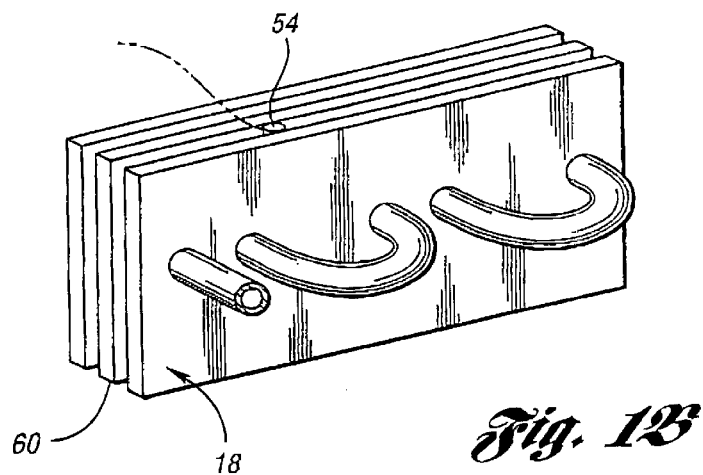
FIG. 1B is a perspective view of a portion of the air conditioning system showing an alternate placement for the evaporator temperature sensor.

Controller 24 includes a control unit 50, an ambient air temperature sensor 52 and an evaporator temperature sensor 54. Ambient air temperature sensor 52 is operable for detecting an ambient air temperature (i.e., the temperature of the air outside structure 42) and responsively producing an ambient air temperature signal. In vehicular applications, ambient air sensor 52 may be coupled to an engine controller which transmits data on the ambient air temperature to control unit 50 via a data buss. Evaporator temperature sensor 54 is operable for detecting a temperature of the output air 28 and responsively producing an evaporator temperature signal. Those skilled in the art will understand that evaporator temperature sensor 54 may directly sense the temperature of the output air 28, or may sense the temperature of a portion of evaporator 18, such as a heat transfer fin 60 as shown in FIG. 1B.

Control unit 50 is coupled to compressor 12, control panel 22, ambient air temperature sensor 52 and evaporator temperature sensor 54. Control unit 50 receives the operational signal, the ambient air temperature signal and the evaporator temperature signal and controls the operation of compressor 12 in accordance with the method of the present invention as set forth in detail below. In the particular example provided, receipt of the operational signal permits control unit 50 to determine whether air conditioning system 10 has been activated, the speed of blower 20 and the mode which is being employed to supply evaporator 18 with air.

Figure 2A:
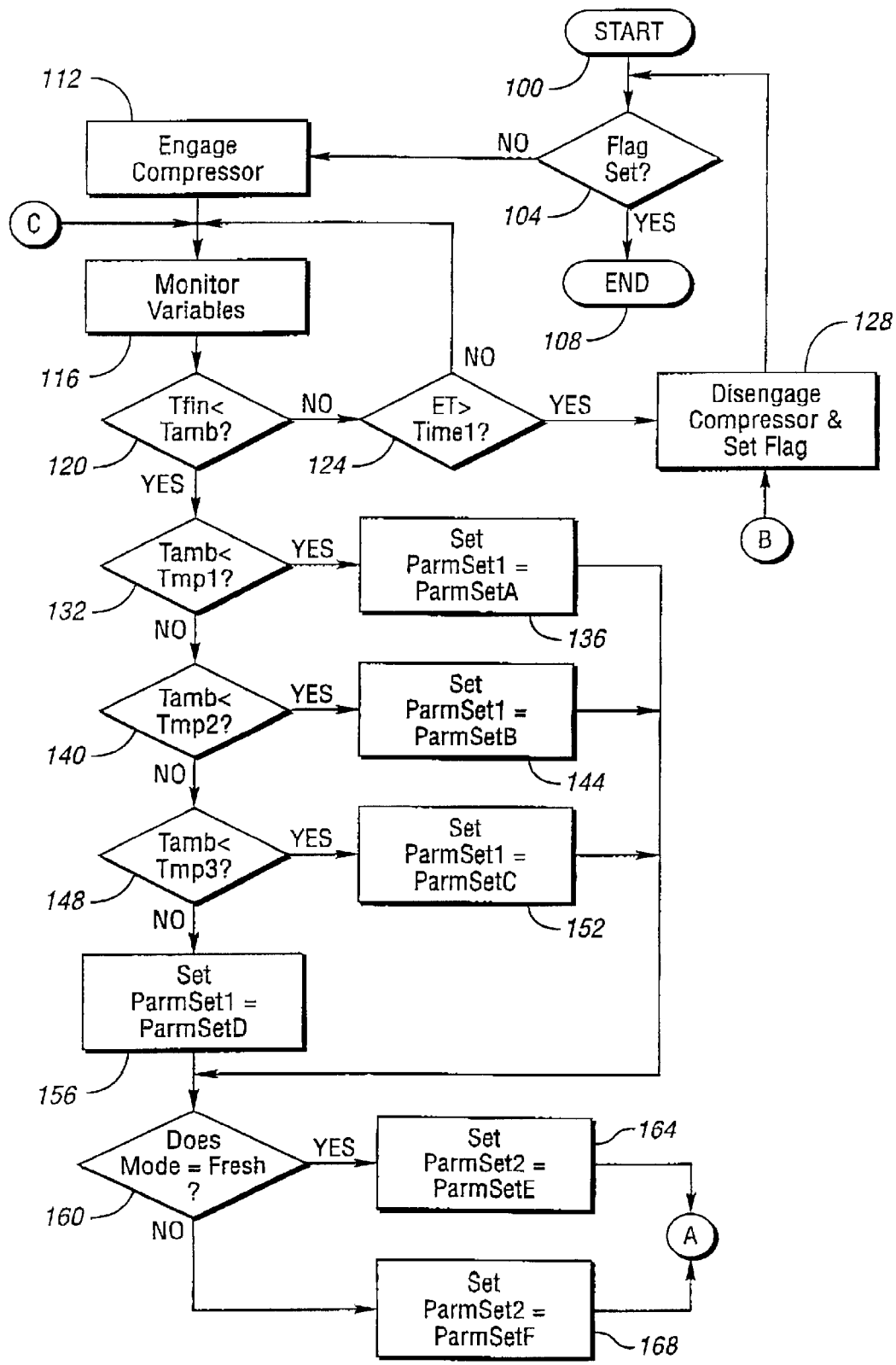
FIG. 2 is a schematic illustration in flowchart form of the method of the present invention.
Figure 2B:
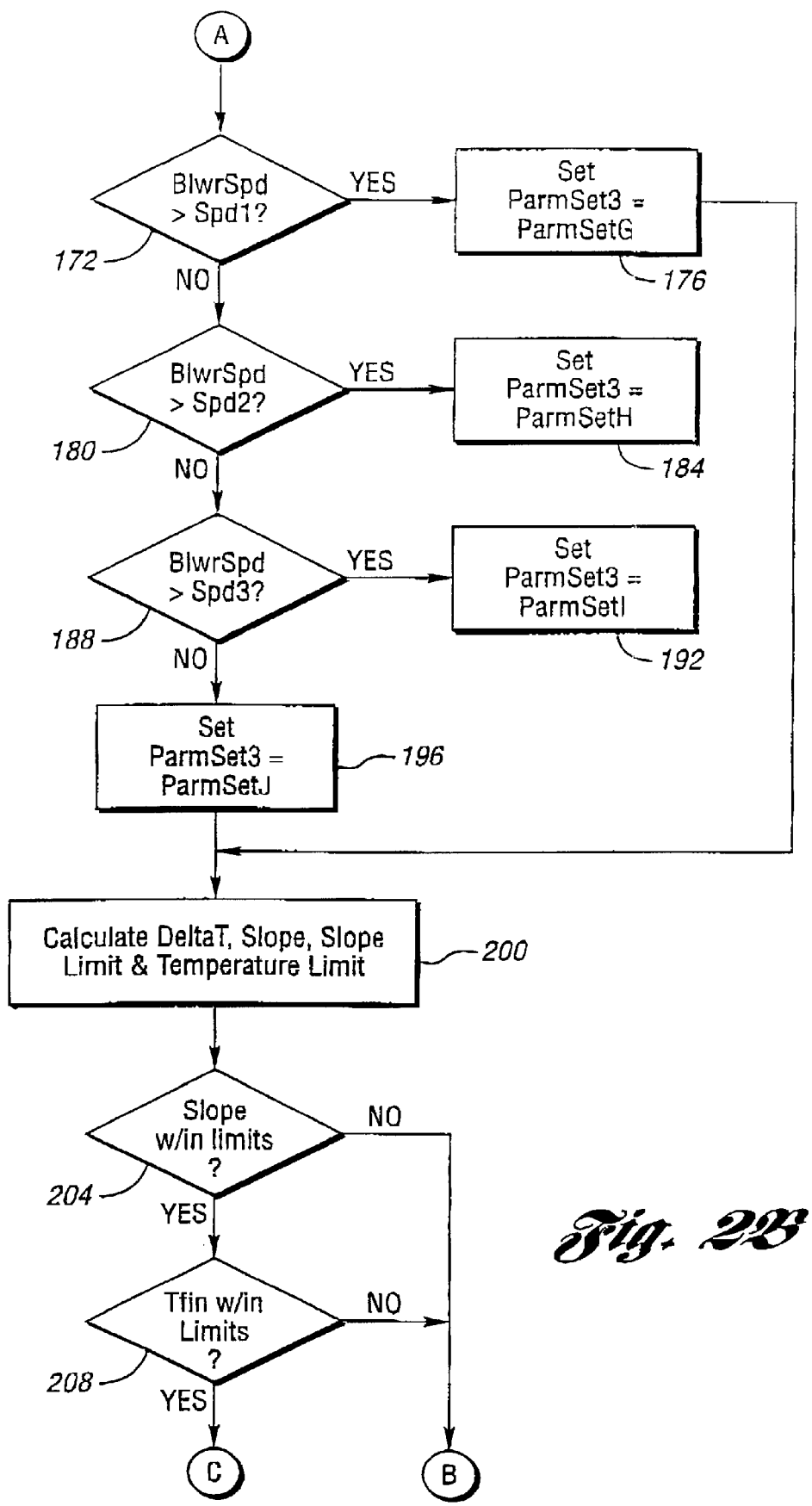

With reference to FIG. 2, the method of the present invention is entered at bubble 100 and proceeds to decision block 104 where the methodology determines if a fault flag had been set previously. If the fault flag has been set, control unit 50 has detected the existence of a low-charge state in a previous iteration of the method and the method proceeds to bubble 108 where the methodology terminates and does not permit compressor 12 to be engaged. If the fault flag has not been set in decision block 104, the method proceeds to block 112 and permits compressor to be engaged.

The methodology next proceeds to block 116 where control unit 50 monitors variables including the evaporator temperature, the ambient air temperature, the speed of blower 20 and the mode for supplying evaporator 18 with air (i.e., fresh or recirculate). The methodology next proceeds to decision block 120 where the evaporator temperature (Tfin) is compared to the ambient air temperature (Tamb). If the evaporator temperature is less than the ambient air temperature, the methodology proceeds to decision block 124. In decision block 124, control unit 50 determines the amount of time that has elapsed (ET) since compressor 12 was first activated. It should be noted that as compressor 12 is not typically operated continuously, each time compressor 12 is deactivated the counter ET is reset to zero. If the elapsed time, ET, does not exceed a predetermined time threshold, which may be set to five minutes, for example, the methodology loops back to block 116. If in decision block 124 the elapsed time, ET, exceeds the predetermined time threshold, the methodology proceeds to block 128 where compressor 12 is disengaged and the fault flag is set indicating that a low-charge condition has been detected by control unit 50. The methodology then loops back to decision block 104.

Returning to decision block 120, if Tfin is less than Tamb, the methodology proceeds to decision block 132 where Tamb is compared to a first temperature threshold, Tmp1, such as 110° F. If Tamb is greater than Tmp1, the methodology proceeds to block 136 where a first parameter set, ParmSet1 is set to a predetermined first set of parameters, ParmSetA. The methodology then proceeds to decision block 160.

If Tamb is not greater than Tmp1 in decision block 132, the methodology proceeds to decision block 140 where Tamb is compared to a second temperature threshold, Tmp2, such as 90° F. If Tamb is greater than Tmp2, the methodology proceeds to block 144 where the first parameter set, ParmSet1, is set to a predetermined second set of parameters, ParmSetB. The methodology then proceeds to decision block 160.

If Tamb is not greater than Tmp2 in decision block 140, the methodology proceeds to decision block 148 where Tamb is compared to a third temperature threshold, Tmp3, such as 70° F. If Tamb is greater than Tmp3, the methodology proceeds to block 152 where ParmSet1 is set to a predetermined third set of parameters, ParmSetC. The methodology then proceeds to decision block 160. If Tamb is not greater than Tmp3 in decision block 148, the methodology proceeds to block 156 where ParmSet1 is set to a predetermined fourth set of parameters, ParmSetD. The method then proceeds to decision block 160.

At decision block 160, the methodology determines whether air from the interior of structure 42 is being recirculated to evaporator 18. If air is not being recirculated, the mode is equal to fresh and the methodology proceeds to block 164 where a second set of parameters, ParmSet2, is set to a fifth set of parameters, ParmSetE. The methodology then proceeds to decision block 172. If the mode is not equal to fresh in decision block 160, air is being recirculated to evaporator 18 and the methodology proceeds to block 168 where ParmSet2 is set to a sixth set of parameters, ParmSetF. The methodology then proceeds to decision block 172.

Decision blocks 172, 180 and 188 permit control unit 50 to determine the speed with which blower 20 is being operated and select a third set of parameters, ParmSet3, accordingly. As blower speed switch 32 in the example provided varies a voltage output to control the speed of blower 20, decision blocks 172, 180 and 188 evaluate the voltage of the blower switch signal to determine the speed of blower 20. However, those skilled in the art will understand that other means for detecting the speed of blower 20 may also be used, including the use of a digital signal indicative of the position of blower speed switch 32.

In decision block 172, the methodology determines if the speed of blower 20, BlwrSpd, exceeds a first speed threshold, Spd1. If BlwrSpd exceeds Spd1, the methodology proceeds to block 176 where ParmSet3 is set to a seventh parameter set, ParmSetG. The methodology then proceeds to block 200. If BlwrSpd does not exceed Spd1 in decision block 172, the methodology proceeds to decision block 180 where the methodology determines if BlwrSpd exceeds a second speed threshold, Spd2. If BlwrSpd exceeds Spd2, the methodology proceeds to block 184 where ParmSet3 is set to a eighth parameter set, ParmSetH. The methodology then proceeds to block 200.

If BlwrSpd does not exceed Spd2 in decision block 180, the methodology proceeds to decision block 188 where the methodology determines if BlwrSpd exceeds a third speed threshold, Spd3. If BlwrSpd exceeds Spd3, the methodology proceeds to block 192 where ParmSet3 is set to a ninth parameter set, ParmSetI. The methodology then proceeds to block 200. If BlwrSpd does not exceed Spd3 in decision block 188, the methodology proceeds to block 196 where ParmSet3 is set to a tenth parameter set, ParmSetJ. The methodology then proceeds to block 200.

At block 200 the methodology employs the ambient air temperature signal and the evaporator temperature signal to calculate a difference signal wherein the difference signal is indicative of the difference between the ambient air temperature and the evaporator temperature. Control unit 50 employs the difference signal to determine a rate of change (i.e., slope) of the difference signal. Control unit 50 also employs ParmSet1, ParmSet2 and ParmSet3 to determine a slope limit and a temperature limit. The slope limit is a lower limit on the rate with which the difference signal changes. Relatively low slopes reflect an insufficient cooling capacity in air conditioning system 10 such that evaporator 18 cannot reject heat to the ambient air at a rate which exceeds a predetermined minimum rate. The minimum rate is varied according to the ambient air temperature, the speed of blower 20 and the mode with which air is being delivered to evaporator 18. The temperature limit is an upper limit on the temperature of evaporator 18. Relatively high temperatures also reflect an insufficient cooling capacity in air conditioning system 10.

The methodology next proceeds to decision block 204 and determines whether the slope of the difference signal is greater than the slope limit. If the slope of the difference signal is less than the slope limit, the methodology proceeds to block 128. If the slope of the difference signal is not less than the slope limit, the methodology proceeds to decision block 208.

In decision block 208, the methodology determines if the evaporator temperature is greater than the temperature limit. If the evaporator temperature is greater than the temperate limit, the methodology proceeds to block 128. If the evaporator temperature is not greater than the temperature limit, the methodology loops back to block 116.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A method for detecting a low-charge state of a compressor in a motor vehicle air conditioning system, the air conditioning system further including an evaporator and a blower, the method including the steps of:

detecting a temperature of the evaporator and responsively producing an evaporator temperature signal;

detecting an ambient air temperature and responsively producing an ambient air temperature signal;

receiving the evaporator temperature signal and the ambient air temperature signal, determining a difference between the evaporator temperature signal and the ambient air temperature signal, and responsively producing a difference signal;

receiving the difference signal, responsively determining a rate of change in the difference signal and responsively producing a rate of change signal; and receiving the rate of change signal and responsively detecting a low-charge condition of the compressor.

2. The method of claim 1, wherein the low-charge condition is detected when the rate of change signal is less than a predetermined minimum change rate.

3. The method of claim 1, further comprising the step of receiving the evaporator temperature signal and responsively detecting a low-charge condition of the compressor.

4. The method of claim 1, wherein the evaporator temperature signal is based on a temperature of air exiting the evaporator.

5. The method of claim 4, wherein the evaporator temperature signal is based on a temperature of a heat exchanger surface of the evaporator.

6. The method of claim 1, wherein responsively determining the rate of change in the difference signal and responsively producing a rate of change signal includes the steps of:

calculating a first slope point, the first slope point being a difference between the evaporator temperature signal and the ambient air temperature signal at a first point in time;

calculating a second slope point, the second slope point being a difference between the evaporator temperature signal and the ambient air temperature signal at a second point in time; and calculating a temperature slope using the first and second slope points; and wherein the step of responsively detecting a low-charge condition of the compressor includes the step of:

determining that a low-charge condition exists if the temperature slope is outside a predetermined slope limit.

7. The method of claim 6, wherein the predetermined slope limit is varied based on the ambient air temperature.

8. The method of claim 1, the step of responsively detecting the low-charge condition of the compressor further comprising:

comparing the temperature of the evaporator with a predetermined temperature threshold; and if the rate of change signal is not indicative of a low-charge condition, determining that a low-charge condition exists if the temperature of the evaporator is outside the predetermined temperature threshold.

9. The method of claim 8, wherein the predetermined temperature threshold is varied based on the ambient air temperature.

10. The method of claim 8, further comprising:

detecting at least one operational characteristic of the air conditioning system, and responsively producing an operational signal in response thereto.

11. The method of claim 10, wherein the step of detecting at least one operational characteristic of the air conditioning system includes the step of determining a speed of the blower.

12. The method of claim 11, wherein the predetermined temperature threshold is varied based on the speed of the blower.

13. The method of claim 11, wherein the predetermined slope limit is varied based on a speed of the blower.

14. The method of claim 11, wherein the step of detecting at least one operation characteristic of the air conditioning system includes the step of determining whether the blower is recirculating air through the air conditioning system.

15. The method of claim 14, wherein the predetermined temperature threshold is varied based on whether the blower is recirculating air through the air conditioning system.

16. The method of claim 14, wherein the predetermined slope limit is varied based on whether the blower is recirculating air through the air conditioning system.

17. An air conditioning system comprising:

a compressor for providing a pressurized refrigerant;

an evaporator having a heat exchanger surface, the evaporator receiving the pressurized refrigerant;

a blower for forcing a supply of air over the heat exchanger surface to transfer heat between the supply of air and the evaporator;

an evaporator temperature sensor operable for sensing a temperature of the evaporator and generating an evaporator temperature signal in response thereto;

an ambient air temperature sensor operable for sensing an ambient air temperature and generating an ambient air temperature signal in response thereto; and a control unit coupled to the compressor, the evaporator temperature sensor, and the ambient air temperature sensor, the control unit operable for calculating a difference signal between the evaporator temperature and the ambient air temperature, the control unit further operable for calculating a slope of the difference signal;

wherein the control unit prevents the compressor from operating if the slope of the difference signal is less than a predetermined minimum slope.

18. The air conditioning system of claim 17, wherein the control unit also prevents the compressor from operating if the evaporator temperature is greater than a predetermined temperature limit.

19. A method for detecting a low-charge state in an air conditioning system having a compressor, an evaporator and a blower, the method including the steps of:

detecting a temperature of the evaporator and responsively producing an evaporator temperature signal;

detecting an ambient air temperature and responsively producing an ambient air temperature signal;

detecting operational characteristics of the air conditioning system including the step of determining the speed of the blower and responsively producing operational signals in response thereto; and receiving the evaporator temperature signal, the ambient air temperature signal and the operational signals and responsively detecting a low-charge condition of the air conditioning system.

20. The method of claim 19, wherein the step of detecting at least one operation characteristic of the air conditioning system includes the step of determining whether the blower is recirculating air through the air conditioning system.

21. The method of claim 19, wherein the step of receiving the evaporator temperature signal, the ambient air temperature signal and the operational signal and responsively detecting the low-charge condition of the air conditioning system includes the step of determining if the temperature of the evaporator is outside a predetermined temperature threshold.

22. The method of claim 21, wherein the predetermined temperature threshold is varied based on the ambient air temperature.

23. The method of claim 21, wherein the predetermined temperature threshold is varied based on a speed of the blower.

24. The method of claim 21, wherein the predetermined temperature threshold is varied based on whether the blower is recirculating air through the air conditioning system.

25. The method of claim 19, wherein the step of receiving the evaporator temperature signal, the ambient air temperature signal and the operational signal and responsively detecting the low-charge condition of the air conditioning system includes the step of determining if the temperature of the evaporator is less than a predetermined temperature threshold.

* * * * *